(No Model.)
R. McCLINTOCK.
RACING HARNESS.
No. 368,727. Patented Aug. 23, 1887.
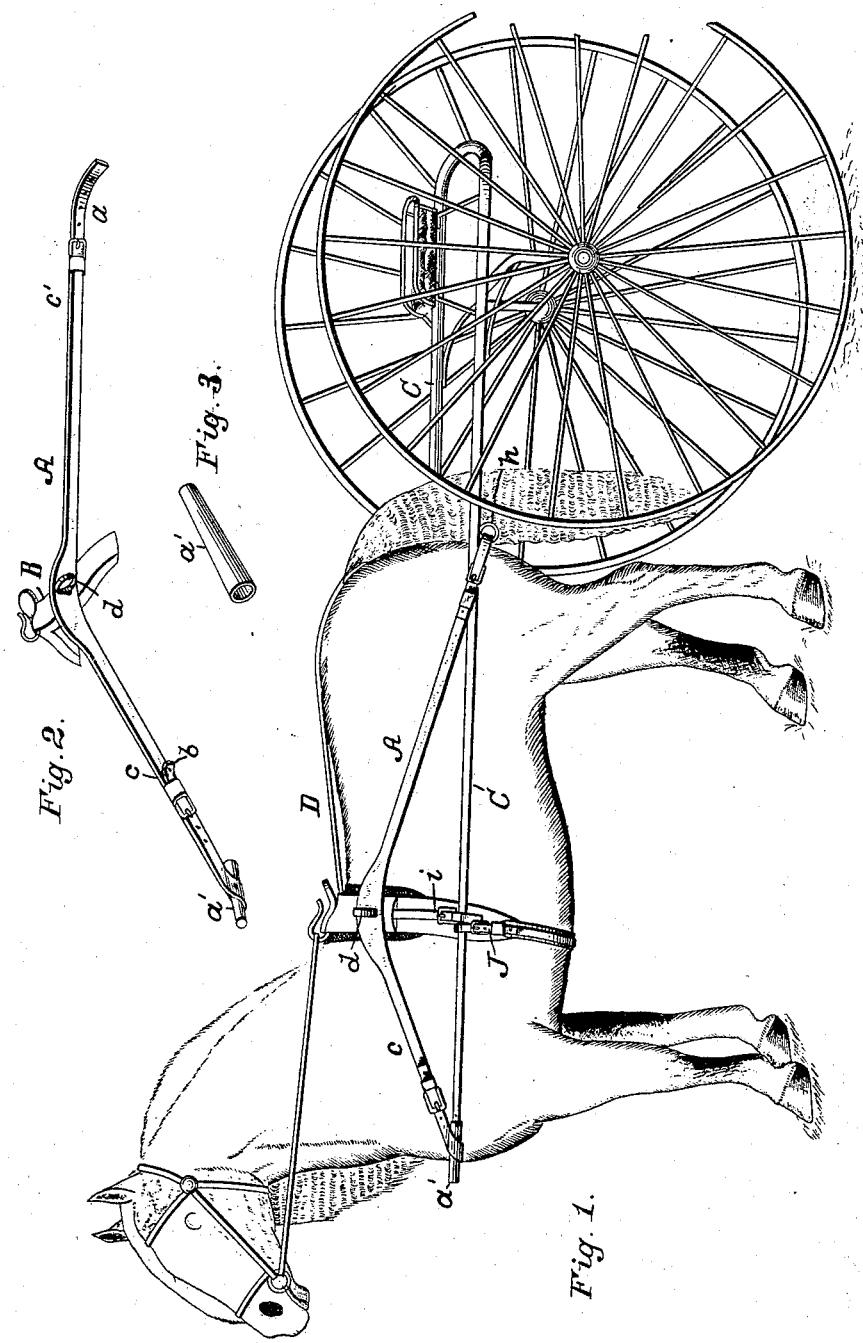
WITNESSES
T. J. Fischer
A. Mason
INVENTOR
Robert McClintock
By J. A. Higdon
Attorney.

UNITED STATES PATENT OFFICE.

ROBERT McCLINTOCK, OF KANSAS CITY, MISSOURI.

RACING-HARNESS.

SPECIFICATION forming part of Letters Patent No. 368,727, dated August 23, 1887.

Application filed June 25, 1887. Serial No. 242,426. (No model.)

*To all whom it may concern:*

Be it known that I, ROBERT McCLINTOCK, of Kansas City, Jackson county, Missouri, have invented certain new and useful Improvements in Harness, of which the following is a full, clear, and exact description, reference being had to the accompanying drawings, forming a part hereof.

The object of this invention is to provide a light racing-harness for horses without using either breast-collar or breeching.

My invention consists in a pair of simple leather straps, which are secured at about the middle of their length to the harness-saddle, or the saddle-band on opposite sides of the horse, and having their forward ends secured to the forward portion of the shafts of the vehicle, and having their rear ends also secured to said shafts, said straps being adjustable to different-sized animals, substantially as herein set forth, and pointed out in the claims.

In the drawings, Figure 1 is a perspective view showing my improved harness in position upon a horse. Fig. 2 is a detail view in perspective of a portion of the harness, and Fig. 3 is a detail view of a pocket located on the ends of the shafts.

A indicates the main straps of the harness, which are located on opposite sides of saddle B, and secured thereto at about the middle of their length by means of terret-rings $d$, which pass therethrough and engage said saddle, as shown. The straps answer the purpose of both breeching and breast-collar in an ordinary single harness, the front portion, $c$, being provided with a buckle of ordinary construction, which is engaged by a shorter section, $b$, and which latter is provided with a series of holes, which are engaged by said buckle, and which carries a pocket, $a'$, at its forward end. The pockets $a'$ are adapted to be placed upon the ends of the shafts C, and, in connection with the front portion, $c$, prevent the vehicle from running onto the horse, and substantially answers all the requirements of the ordinary breeching, with the added advantage of offering no obstruction to the free movements of the animal. The rear section, $c'$, is provided with a buckle and a series of apertures at its rear end, so as to form a loop, $a$, by means of which it is secured to the shafts in any desired way.

Although I here show loop $a$ engaging a ring, $h$, upon the under side of the shafts, yet it should be obvious that other styles of fastening devices may be employed for the purpose of securing the rear ends of the straps A to the vehicle. It will be understood that the sections $c'$ answer all the requirements of harness-tugs, besides leaving the rear limbs of the animal perfectly free.

If desired, I may make the straps A in three or more sections, and connect the sections together by means of ordinary buckles, without departing from my invention, as is evident.

In this harness the ordinary saddle and girths and crupper D are made use of. In hitching up an animal with this harness I first place the caps $a'$ on the ends of the shafts, then secure the rear ends of sections $c'$ to rings $h$, or other fastening devices, after which I buckle up the saddle girth or girths.

The girth J, which is of ordinary construction, holds the shafts down to their proper position and keeps the straps A taut at all times. The horse is perfectly free both front and back.

A harness thus constructed will be very light, and will permit the horse to make the best speed that he is capable of. Its cost is also very small when compared with the ordinary single harness. The straps A may be applied to an ordinary single harness by dispensing with breast-collar, tugs, and breeching and securing the straps A to the saddle, as before described.

One great objection to harness having a breeching is especially overcome by my improved harness, and that is, for instance, when the horse is pulled hard the breeching will not be pressed forcibly against his flanks, and consequently his hind legs will not be "tangled," as will be the case with ordinary harness having a breeching.

Having thus described my invention, what I claim is—

1. A racing-harness consisting in a pair of straps located on opposite sides of the horse, substantially as set forth, and having their forward and rear ends secured to the shafts of the vehicle, in combination with a suitable saddle or saddle-band, to which said straps are secured at about the middle of their length, substantially as described.

2. In a harness, the straps A, provided with devices, substantially as described, at their forward and rear ends for securing them to the shafts of a vehicle, in combination with saddle B, to which said straps are secured at about the middle of their length, substantially as described.

3. In a harness, the straps A, provided with loop $a$ at their rear ends and carrying pockets $a'$ at their forward ends, in combination with saddle B, to which said straps are secured at about the middle of their length, substantially as herein described.

4. In a harness, a strap or straps, A, consisting of forward section, $c$, and rear section, $c'$, in combination with removable section $b$ and pocket $a'$, substantially as herein described.

In testimony whereof I affix my signature in presence of two witnesses.

ROBERT McCLINTOCK.

Witnesses:
    A. SAVAGE,
    F. G. FISCHER.